(12) United States Patent
Liu et al.

(10) Patent No.: US 11,906,037 B2
(45) Date of Patent: Feb. 20, 2024

(54) COOLING AND LUBRICATING OIL PATHS FOR POWER ASSEMBLY AND VEHICLE

(71) Applicant: Huawei Digital Power Technologies Co., Ltd., Shenzhen (CN)

(72) Inventors: Hongbing Liu, Shanghai (CN); Xiang Fang, Shenzhen (CN); Yi Cao, Shenzhen (CN); Jiangang Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/964,116

(22) Filed: Oct. 12, 2022

(65) Prior Publication Data
US 2023/0114407 A1    Apr. 13, 2023

(30) Foreign Application Priority Data
Oct. 12, 2021  (CN) .......................... 202111186141.3

(51) Int. Cl.
*F16H 57/04* (2010.01)
*B60K 1/02* (2006.01)
*B60K 1/00* (2006.01)

(52) U.S. Cl.
CPC ..... *F16H 57/0476* (2013.01); *F16H 57/0415* (2013.01); *F16H 57/0423* (2013.01); *F16H 57/0435* (2013.01); *F16H 57/0441* (2013.01); *F16H 57/0445* (2013.01); *B60K 1/02* (2013.01); *B60K 2001/006* (2013.01)

(58) Field of Classification Search
CPC ............ F16H 57/0415; F16H 57/0434; F16H 57/0435; F16H 57/0436; F16H 57/0441; F16H 57/0445; F16H 57/0476
See application file for complete search history.

(56) References Cited

U.S. PATENT DOCUMENTS

| | | | |
|---|---|---|---|
| 9,266,423 B2 * | 2/2016 | Hoshinoya | B60K 6/48 |
| 10,465,574 B2 * | 11/2019 | Kiyokami | F16H 57/0415 |
| 10,690,234 B1 * | 6/2020 | Oury, Jr. | B60K 11/02 |
| 11,143,288 B2 * | 10/2021 | Kiyokami | F01P 11/08 |
| 2017/0175612 A1 | 6/2017 | Tokozakura et al. | |
| 2018/0334025 A1 * | 11/2018 | Hashimoto | B60K 1/02 |
| 2019/0081537 A1 * | 3/2019 | Kiyokami | F16H 57/043 |

(Continued)

FOREIGN PATENT DOCUMENTS

| | | |
|---|---|---|
| CN | 101092110 A | 12/2007 |
| CN | 101403385 A | 4/2009 |

(Continued)

*Primary Examiner* — Minh Truong
(74) *Attorney, Agent, or Firm* — Maier & Maier, PLLC

(57) ABSTRACT

A power assembly and a vehicle. The power assembly includes a housing, and a first drive motor, a first speed reducer, a first oil path, a second drive motor, a second speed reducer, a second oil path, and a third oil path that are located inside the housing. The power assembly further includes a first oil pump and a second oil pump. The housing is provided with an oil pan. The first drive motor includes a first stator and a first rotor. The second drive motor includes a second stator and a second rotor. Both the first oil pump and the second oil pump are connected to the oil pan. The power assembly simplifies the oil paths in the housing and improve an integration level.

17 Claims, 13 Drawing Sheets

(56) References Cited

U.S. PATENT DOCUMENTS

2019/0285165 A1\* 9/2019 Hashimoto .......... B60W 20/10
2020/0292041 A1 9/2020 Zheng et al.

FOREIGN PATENT DOCUMENTS

| | | | |
|---|---|---|---|
| CN | 102003263 | A | 4/2011 |
| CN | 102275521 | A | 12/2011 |
| CN | 205178739 | U | 4/2016 |
| CN | 205350303 | U | 6/2016 |
| CN | 107612286 | A | 1/2018 |
| CN | 208295094 | U | 12/2018 |
| CN | 109139895 | A | 1/2019 |
| CN | 109474127 | A | 3/2019 |
| CN | 110091700 | A | 8/2019 |
| CN | 110365138 | A | 10/2019 |
| CN | 209860741 | U | 12/2019 |
| CN | 110696608 | A | 1/2020 |
| CN | 111016631 | A | 4/2020 |
| CN | 111162633 | A | 5/2020 |
| CN | 111823853 | A | 10/2020 |
| CN | 111835117 | A | 10/2020 |
| CN | 112092607 | A | 12/2020 |
| CN | 112106281 | A | 12/2020 |
| CN | 112234770 | A | 1/2021 |
| CN | 112421889 | A | 2/2021 |
| CN | 112721620 | A | 4/2021 |
| CN | 213734582 | U | 7/2021 |
| CN | 113452202 | A | 9/2021 |
| DE | 102013223409 | A1 | 5/2015 |
| JP | 2017061226 | A | 3/2017 |
| JP | 6458695 | B2 | 1/2019 |
| WO | 2020250567 | A1 | 12/2020 |

\* cited by examiner

US 11,906,037 B2

COOLING AND LUBRICATING OIL PATHS FOR POWER ASSEMBLY AND VEHICLE

CROSS-REFERENCE TO RELATED APPLICATIONS

This application claims priority to Chinese Patent Application No. 202111186141.3, filed on Oct. 12, 2021, which is hereby incorporated by reference in its entirety.

TECHNICAL FIELD

The embodiments relate to the field of dual-drive vehicle technologies, a power assembly, and a vehicle.

BACKGROUND

With the pursuit of extreme performance and extreme motion experience of high-end models, some enterprises introduce a dual-drive model. The dual-drive model poses a higher challenge to power performance, and a peak rotational speed and peak torque of a motor need to be improved significantly. Increase in torque means that a current increases, a coil copper loss increases, efficiency of the motor in a high-speed section decreases significantly with a rotational speed, heat generating power increases, temperature of the motor increases, and a cooling requirement increases. A dual-drive power assembly includes dual motors and dual speed reducers. Because a quantity of parts is doubled, an amount of required cooling oil is doubled. In addition, setting of a cooling oil path is more complex, and it is difficult to process and manufacture the cooling oil path.

SUMMARY

The embodiments may provide a power assembly and a vehicle, so that an oil path in a housing can be simplified, and a good cooling and lubrication effect can be implemented.

According to a first aspect, the embodiments may provide a power assembly including a housing. An oil pan for storing lubricating oil is disposed on the housing. A first drive motor, a first speed reducer, a first oil path, a second drive motor, a second speed reducer, a second oil path, and a third oil path are disposed inside the housing. The power assembly further includes a first oil pump and a second oil pump. The first drive motor includes a first stator and a first rotor, and the first speed reducer is connected to the first rotor. The second drive motor includes a second stator and a second rotor, and the second speed reducer is connected to the second rotor. An oil inlet of the first oil pump is connected to the oil pan, and an oil outlet of the first oil pump is connected to the first oil path, so that the first oil pump can pump the lubricating oil in the oil pan into the first stator and the second stator by using the first oil path. An oil inlet of the second oil pump is connected to the oil pan, and an oil outlet of the second oil pump is connected to the second oil path, so that the second oil pump can pump the lubricating oil in the oil pan into the first rotor and the second rotor by using the second oil path. The third oil path is connected to at least one of the first oil path and the second oil path, to supply the lubricating oil to the first speed reducer and the second speed reducer for lubrication.

Compared with a conventional power assembly, the first oil pump and the second oil pump may be disposed to respectively pump oil into a stator and a rotor of a dual-drive motor, the third oil path may be connected to the first oil path, the third oil path may be connected to the second oil path, or the third oil path may be connected to both the first oil path and the second oil path, so that at least one oil pump can distribute oil to speed reducers on both sides for lubrication. In the foregoing power assembly, the first oil pump and the second oil pump are disposed, so that stators and rotors of drive motors on both sides and the speed reducers are lubricated, and in addition, an integration level of oil paths is improved, so that the oil path inside the housing is simplified.

In some possible implementation solutions, the power assembly further includes a heat exchanger. Both the first oil pump and the second oil pump are connected to the heat exchanger. Therefore, the first oil pump sends the lubricating oil to the heat exchanger for cooling, and then the lubricating oil passes through the first oil path and enters the first stator and the second stator; and the second oil pump sends the lubricating oil to the heat exchanger for cooling, and then the lubricating oil passes through the second oil path and enters the first rotor and the second rotor. The heat exchanger cools the lubricating oil, and therefore, a system has functions of cooling and lubricating the stator, the rotor, and the speed reducers on both sides, and it is ensured that temperature of the dual-drive motor and temperature of the speed reducer are maintained in a normal range, so that good performance of the assembly is ensured.

In some embodiments, a first heat exchange branch and a second heat exchange branch that are mutually independent are disposed inside the heat exchanger, the first heat exchange branch corresponds to the first oil pump to cool the lubricating oil entering the stators on both sides, and the second heat exchange branch corresponds to the second oil pump to cool the lubricating oil entering the rotors on both sides. Only one heat exchanger is disposed, so that an integration level in the housing is improved, and an internal structure of the housing is simpler.

In some embodiments, a heat exchange main pipe may also be disposed in the heat exchanger. Both the oil outlet of the first oil pump and the oil outlet of the second oil pump are connected to an oil inlet of the heat exchange main pipe, and the first oil path and the second oil path are separately connected to an oil outlet of the heat exchange main pipe. In this structure, alternatively, only one heat exchanger may be disposed, so that an integration level in the housing is improved.

In some possible implementations, the third oil path used to lubricate the speed reducers on both sides may be connected only to the first oil path, may be connected only to the second oil path, or may be connected to both the first oil path and the second oil path. When the third oil path is connected to the first oil path and the second oil path, a first branch may be disposed on the first oil path, and the first branch is connected to the third oil path, so that some lubricating oil in the first oil path enters the third oil path through the first branch. In addition, a second branch may be disposed on the second oil path, and the second branch is connected to the third oil path, so that some lubricating oil in the second oil path enters the third oil path through the second branch.

A structure of the third oil path may be based on lubrication requirements of the drive motors and the speed reducers on both sides or may be based on an internal structure of the housing, so that use of a plurality of application scenarios can be implemented. In some possible implementation solutions, a first flow regulating apparatus is disposed on the first oil path and is configured to regulate flow for lubricating the first stator and the second stator. In implementation, the first oil path may include a first pipeline for supplying oil to the first stator and a second pipeline for supplying oil to the second stator, and the first flow regulating apparatus may be disposed on the first pipeline or the second pipeline, to distribute flow to the stators on both sides based on a requirement.

In this implementation solution, the first flow regulating apparatus may be a first throttling component disposed on the first pipeline or a first throttling component disposed on the second pipeline. The first throttling component may reduce flow on the first oil path or the second oil path, so that the flow is regulated.

In some possible implementation solutions, a second flow regulating apparatus may also be disposed on the second oil path and is configured to regulate flow for lubricating the first rotor and the second rotor. In implementation, the second oil path may include a third pipeline for supplying oil to the first rotor and a fourth pipeline for supplying oil to a second rotor, and the second flow regulating apparatus may be disposed on the third pipeline or the fourth pipeline, to distribute flow to the rotors on both sides based on a requirement.

In this implementation solution, the second flow regulating apparatus may be a second throttling component disposed on the third pipeline or a second throttling component disposed on the fourth pipeline. The second throttling component may reduce flow on the third oil path or the fourth oil path, so that the flow is regulated.

In some possible implementation solutions, a third flow regulating apparatus may also be disposed on the third oil path and is configured to regulate flow for lubricating the first speed reducer and the second speed reducer. In implementation, the third oil path may include a fifth pipeline for supplying oil to the first speed reducer and a sixth pipeline for supplying oil to the second speed reducer, and the third flow regulating apparatus may be disposed on the fifth pipeline or the sixth pipeline, to distribute flow to the speed reducers on both sides based on a requirement.

In this implementation solution, the third flow regulating apparatus may be a third throttling component disposed on the fifth pipeline or a third throttling component disposed on the sixth pipeline. The third throttling component may reduce flow on the fifth oil path or the sixth oil path, so that the flow is regulated.

In some possible implementation solutions, the first speed reducer includes a first cavity, and the second speed reducer includes a second cavity. The first cavity and the second cavity can be connected, so that lubrication oil levels in the first cavity and the second cavity are consistent, a case in which oil volumes in the cavities on both sides are different in a running process is avoided, and an air suction phenomenon is prevented in the first oil pump or the second oil pump.

According to a second aspect, the embodiments may provide a vehicle, including a drive wheel and the power assembly according to any one of the foregoing possible implementation solutions. The power assembly is connected to the drive wheel for transmission, so that the power assembly provides driving force for the vehicle. In this way, it is ensured that the vehicle can run. Because the power assembly simplifies an oil path in a housing, a good lubrication effect is implemented, and running performance of the vehicle is improved.

DETAILED DESCRIPTION OF THE EMBODIMENTS

The following clearly describes the embodiments with reference to the accompanying drawings.

With the development of a dual-drive vehicle, requirements for a dual-drive power assembly inside the vehicle are further improved. The requirements are embodied in the following aspects: 1. The dual-drive power assembly includes dual motors and dual speed reducers. A quantity of stators, a quantity of rotors, a quantity of gears, and a quantity of bearings of a drive motor are doubled. Therefore, an amount of required cooling oil is doubled, and a capability of an oil pump needs to be improved or a quantity of oil pumps needs to be increased to adapt to the requirement. 2. In the dual-drive power assembly, it needs to ensure that drive motors and speed reducers on both sides have close working temperature, to ensure lifespan consistency. Therefore, cooling lubricating oil amounts of the drive motors and the speed reducers on both sides need to be evenly distributed. 3. Because a quantity of parts that need to be lubricated increases, a quantity of lubrication oil paths increases. Therefore, an oil path in a housing of the dual-drive power assembly needs to be simplified as much as possible, to reduce oil resistance and processing and manufacturing steps.

Figure 1:
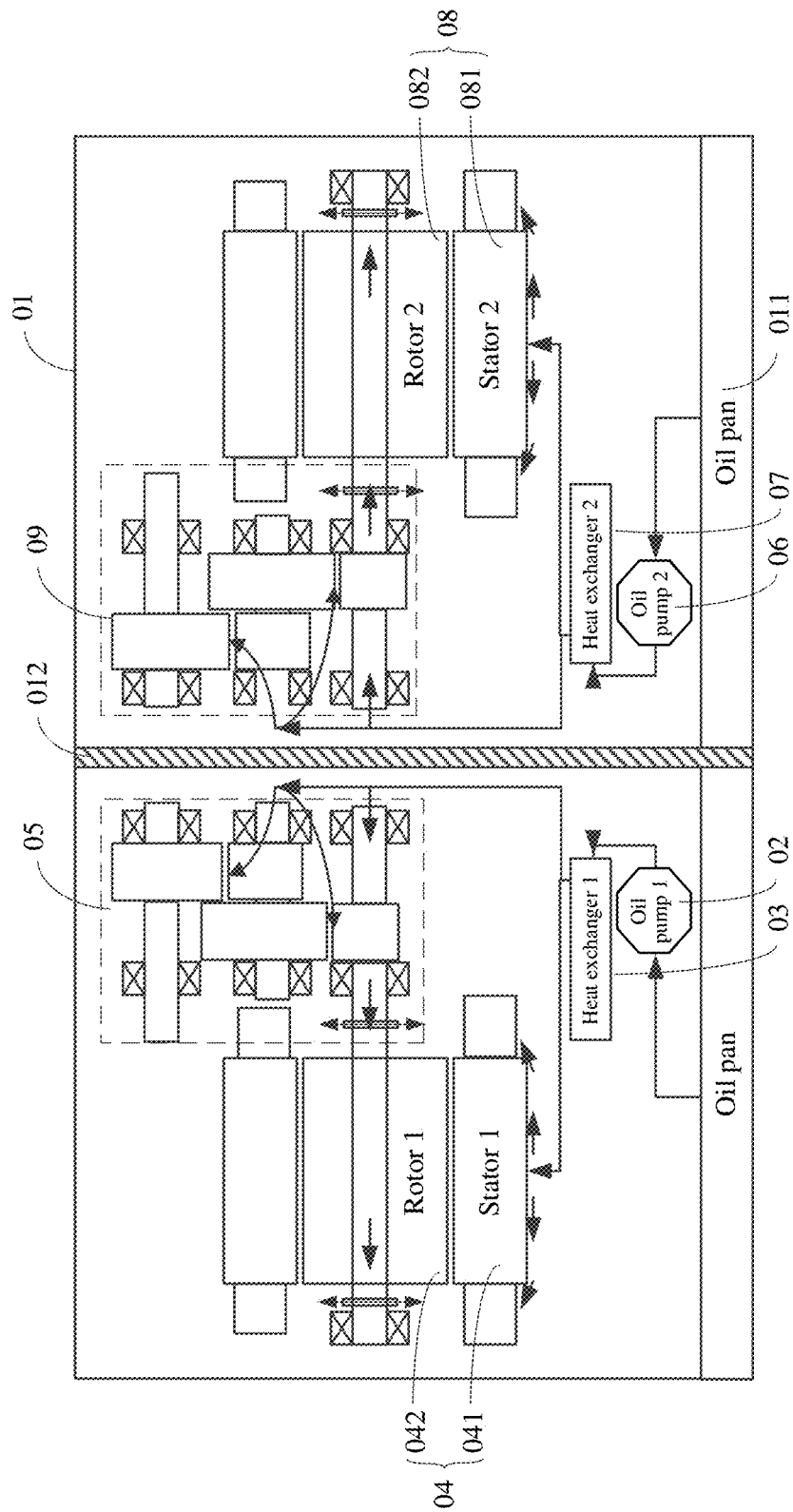
FIG. 1 is a schematic diagram of a structure of a dual-drive power assembly in a conventional technology.

To meet an increasing amount of required oil of existing dual-drive and improve flexibility of an oil pump control policy, a dual-oil pump solution may be used for cooling and lubrication. FIG. 1 is a schematic diagram of an overall oil path structure of an existing dual-drive power assembly. The dual-drive power assembly includes a housing 01. An oil pan 011 for storing lubricating oil is disposed inside the housing 01. A separator 012 is disposed inside the housing 01, and the separator 012 may separate a part inside the housing 01 into two independent spaces, and separate the oil pan 011 into two independent parts. Inside one space, a first drive motor 04, a first speed reducer 05, and a first oil pump 02 and a first heat exchanger 03 corresponding to the space are disposed. The first drive motor 04 includes a first stator 041 and a first rotor 042. Inside the other space, a second drive motor 08, a second speed reducer 09, and a second oil pump 06 and a second heat exchanger 07 corresponding to the space are disposed. The second drive motor 08 includes a second stator 081 and a second rotor 082. In the dual-drive power assembly, the first oil pump 02 pumps the lubricating oil from the oil pan 011 into the first drive motor 04 and the first speed reducer 05 through the first heat exchanger 03, to cool and lubricate the first drive motor 04 and the first speed reducer 05; and the second oil pump 06 pumps the lubricating oil from the oil pan 011 into the second drive motor 08 and the second speed reducer 09 through the second heat exchanger 07, to cool and lubricate the second drive motor 08 and the second speed reducer 09.

In a structure of the foregoing dual-drive power assembly, a heat exchanger needs to be disposed for each oil pump because an internal space of the housing 01 is separated by using the separator 012; and because an oil path in the housing is complex and an integration level is low, it is relatively inconvenient. In addition, because the drive motors on both sides are independent of each other, it is inconvenient to control heat dissipation conditions of the drive motors on both sides.

Figure 2:
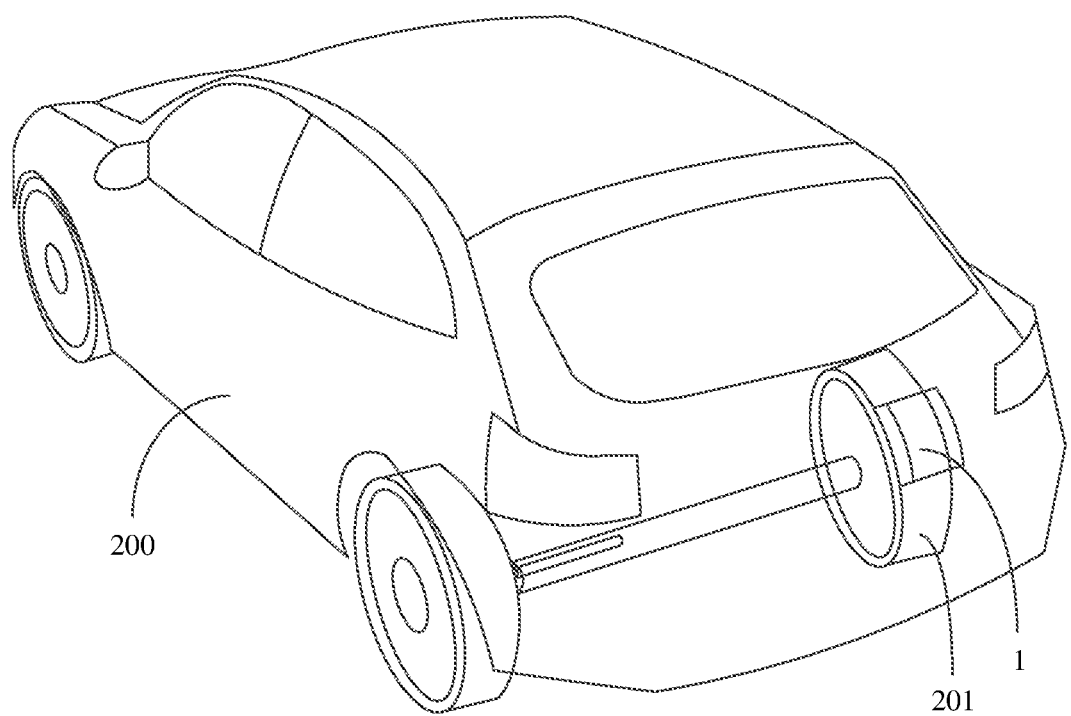
FIG. 2 is a schematic diagram of a structure of a vehicle according to an embodiment.

Based on this, this embodiment may provide a power assembly 1, to simplify an oil path in a housing and improve an integration level. An embodiment may further provide a vehicle 200. FIG. 2 is a schematic diagram of the vehicle 200 according to this embodiment. The vehicle 200 includes a drive wheel 201 and the power assembly 1. The power assembly 1 may be connected to the drive wheel 201 for transmission and is configured to provide driving force for the vehicle 200, so that the vehicle 200 can run normally.

Figure 3:
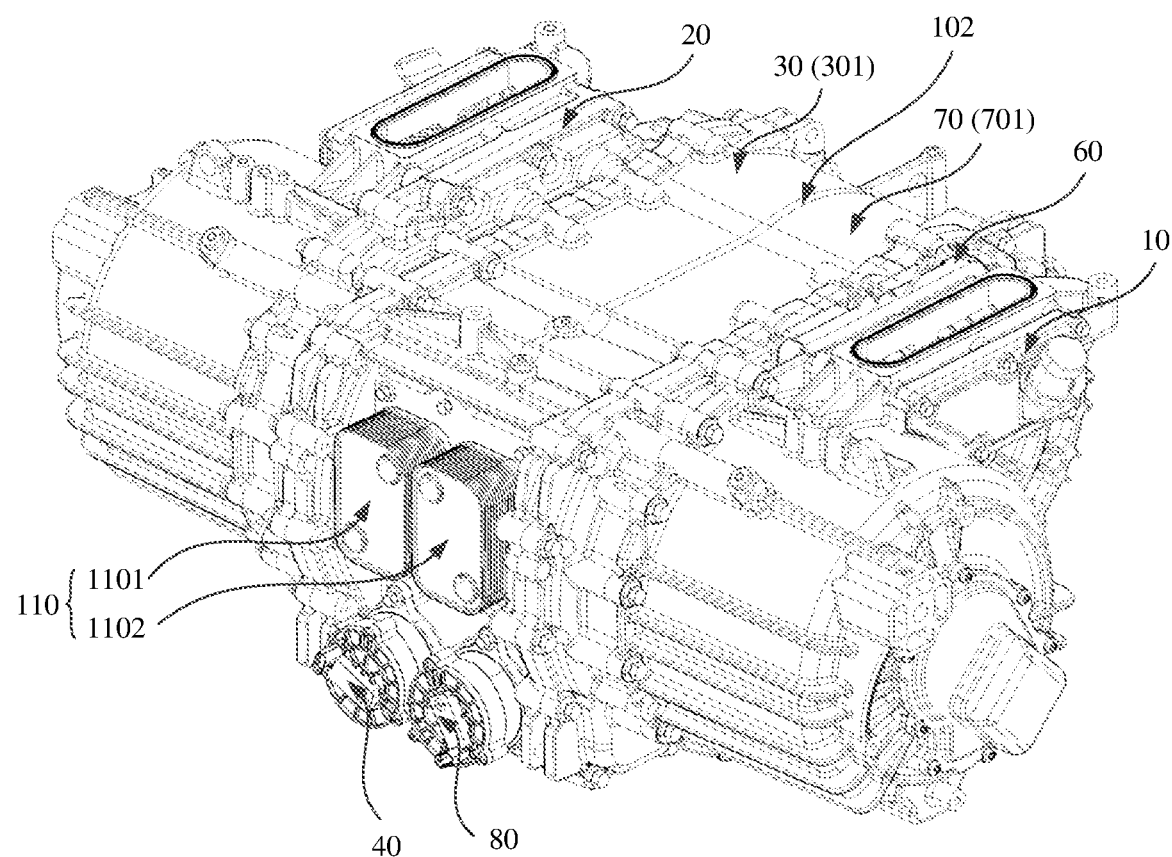
FIG. 3 is a schematic diagram of an overall structure of a power assembly in FIG. 2.
Figure 4:
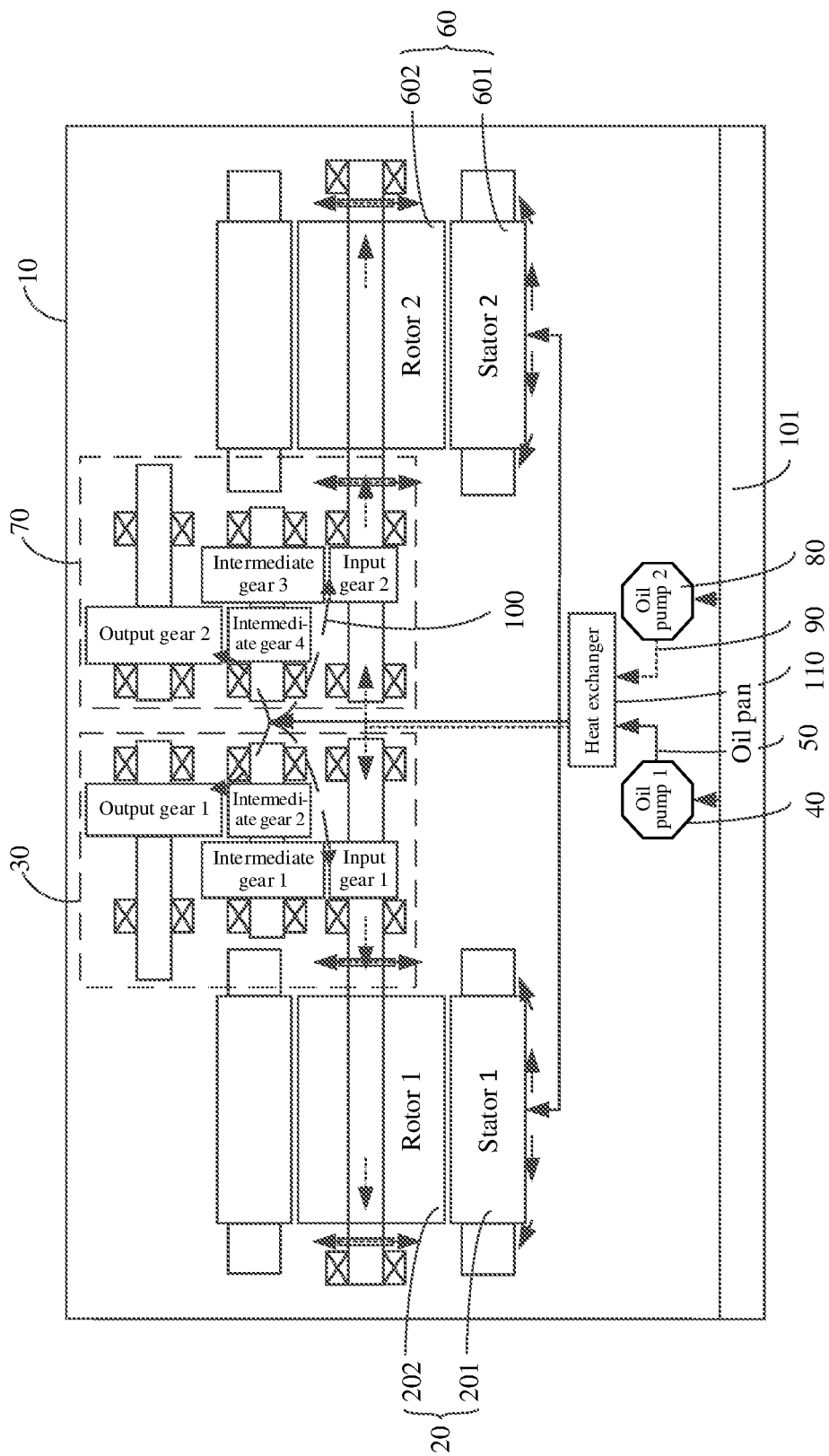
FIG. 4 is a schematic diagram of an overall oil path structure of a power assembly in FIG. 2.

FIG. 3 is a schematic diagram of an overall structure of the power assembly in FIG. 2. FIG. 4 is a schematic diagram of an overall oil path structure of the power assembly in FIG. 2. The power assembly in this embodiment may include a housing 10. An oil pan 101 for storing lubricating oil is disposed at the bottom of the housing 10. A first drive motor 20, a first speed reducer 30, a first oil path 50, a second drive motor 60, a second speed reducer 70, a second oil path 90, and a third oil path 100 are disposed inside the housing 10, and the power assembly further includes a first oil pump 40 and a second oil pump 80. The first drive motor 20 may include a first stator 201 and a first rotor 202, the first rotor 202 is rotatably assembled in the first stator 201, and the first speed reducer 30 is connected to the first rotor 202 for transmission. The second drive motor 60 may include a second stator 601 and a second rotor 602, the second rotor 602 is rotatably assembled in the second stator 601, and the second speed reducer 70 is connected to the second rotor 602 for transmission. An oil inlet of the first oil pump 40 is connected to the oil pan 101, an oil outlet of the first oil pump 40 is connected to the first oil path 50, and the first oil pump 40 may be configured to pump the lubricating oil in the oil pan 101 into the first oil path 50, and supply oil to the first stator 201 and the second stator 601 by using the first oil path 50. An oil inlet of the second oil pump 80 is connected to the oil pan 101, an oil outlet of the second oil pump 80 is connected to the second oil path 90, and the second oil pump 80 may be configured to pump the lubricating oil in the oil pan 101 into the second oil path 90, and supply oil to the first rotor 202 and the second rotor 602 by using the second oil path 90. The third oil path 100 may be connected to at least one of the first oil path 50 or the second oil path 90 and is configured to supply oil to the first speed reducer 30 and the second speed reducer 70.

For example, the third oil path 100 may be connected to the first oil path 50, so that some lubricating oil in the first oil path 50 can enter the third oil path 100; alternatively, the third oil path 100 may be connected to the second oil path 90, so that some lubricating oil in the second oil path 90 can enter the third oil path 100; alternatively, the third oil path 100 may be connected to both the first oil path 50 and the second oil path 90, and in this case, both some lubricating oil in the first oil path 50 and some lubricating oil in the second oil path 90 can enter the third oil path 100, so that the third oil path 100 supplies oil to the first speed reducer 30 and the second speed reducer 70.

It should be noted that the first oil pump 40 and the second oil pump 80 may be either mechanical oil pumps or electronic oil pumps. This is not limited. In addition, positions of the first oil pump 40 and the second oil pump 80 are not limited. For example, the first oil pump 40 and the second oil pump 80 may be mounted on an outer surface of the housing 10, may be mounted on an inner surface of the housing 10, or may be located outside the housing 10 and are connected to an oil path in the housing 10 by using an external pipeline connected to the housing 10.

In some embodiments, as shown in FIG. 3 and FIG. 4, the power assembly may further include a heat exchanger 110, and a first heat exchange branch 1101 and a second heat exchange branch 1102 that are mutually independent may be disposed in the heat exchanger 110. The first heat exchange branch 1101 is connected to the first oil pump 40, and the second heat exchange branch 1102 is connected to the second oil pump 80, so that lubricating oil flowing out of the first oil pump 40 and lubricating oil flowing out of the second oil pump 80 are mutually independent and do not affect each other. Under a driving action of the first oil pump 40 and the second oil pump 80, the lubricating oil first enters the heat exchanger 110 for cooling, and then enters drive motors and speed reducers on both sides. In addition to achieving a lubricating effect, the lubricating oil may further have an effect of cooling the drive motors and the speed reducers, to ensure that temperature of a dual-drive motor and temperature of the speed reducers remain in a normal range, so that good performance of the power assembly is ensured.

Figure 5:
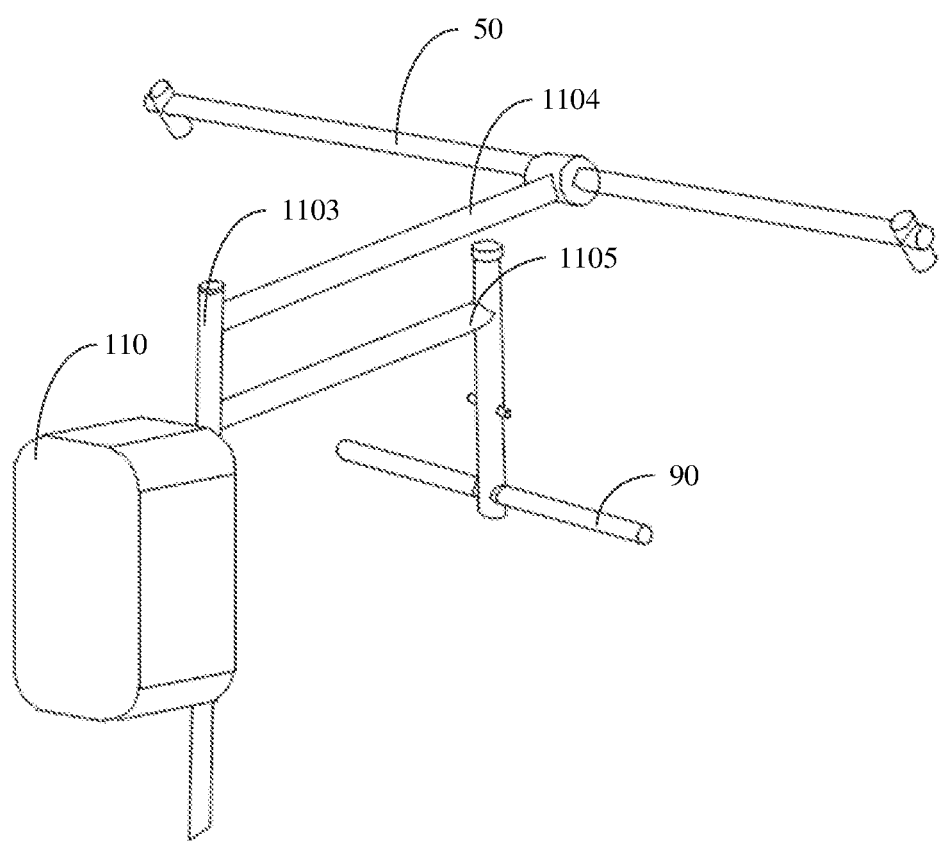
FIG. 5 is a schematic diagram of a partial oil path structure of a power assembly in FIG. 2.

In some embodiments, as shown in FIG. 5, a heat exchange main pipe 1103 may be disposed in the heat exchanger 110, and an oil inlet of the heat exchange main pipe 1103 is connected to the oil pan 101. A first branch 1104 and a second branch 1105 may further be disposed inside the housing 10. One end of the first branch 1104 is connected to the heat exchange main pipe 1103, and the other end is connected to the first oil path 50. One end of the second branch 1105 is connected to the heat exchange main pipe 1103, and the other end is connected to the second oil path 90. In other words, one heat exchange main pipe 1103 is disposed in the heat exchanger 110, so that lubricating oil entering the first oil path 50 and the second oil path 90 may be cooled, and further, an integration level of a system can be improved.

It should be noted that a position of the heat exchanger 110 is not limited. For example, the heat exchanger 110 may be mounted on an outer surface of the housing 10, may be mounted on an inner surface of the housing 10, or may be located outside the housing 10 and is connected to an oil path in the housing 10 by using an external pipeline connected to the housing 10.

It should be noted that, in the foregoing power assembly, two oil paths are used to separately cool and lubricate the stator and the rotor, the third oil path 100 that cools and lubricates the speed reducer is connected to at least one of the first oil path 50 or the second oil path 90, and only one heat exchanger 110 is disposed, so that a cooling and lubrication effect can be achieved, and further, the oil path in the housing 10 can be simplified, and an integration level of the power assembly can be improved. In addition, a structure of the third oil path 100 may alternatively be distributed based on an amount of required oil, to implement use of a plurality of application scenarios.

Figure 6:
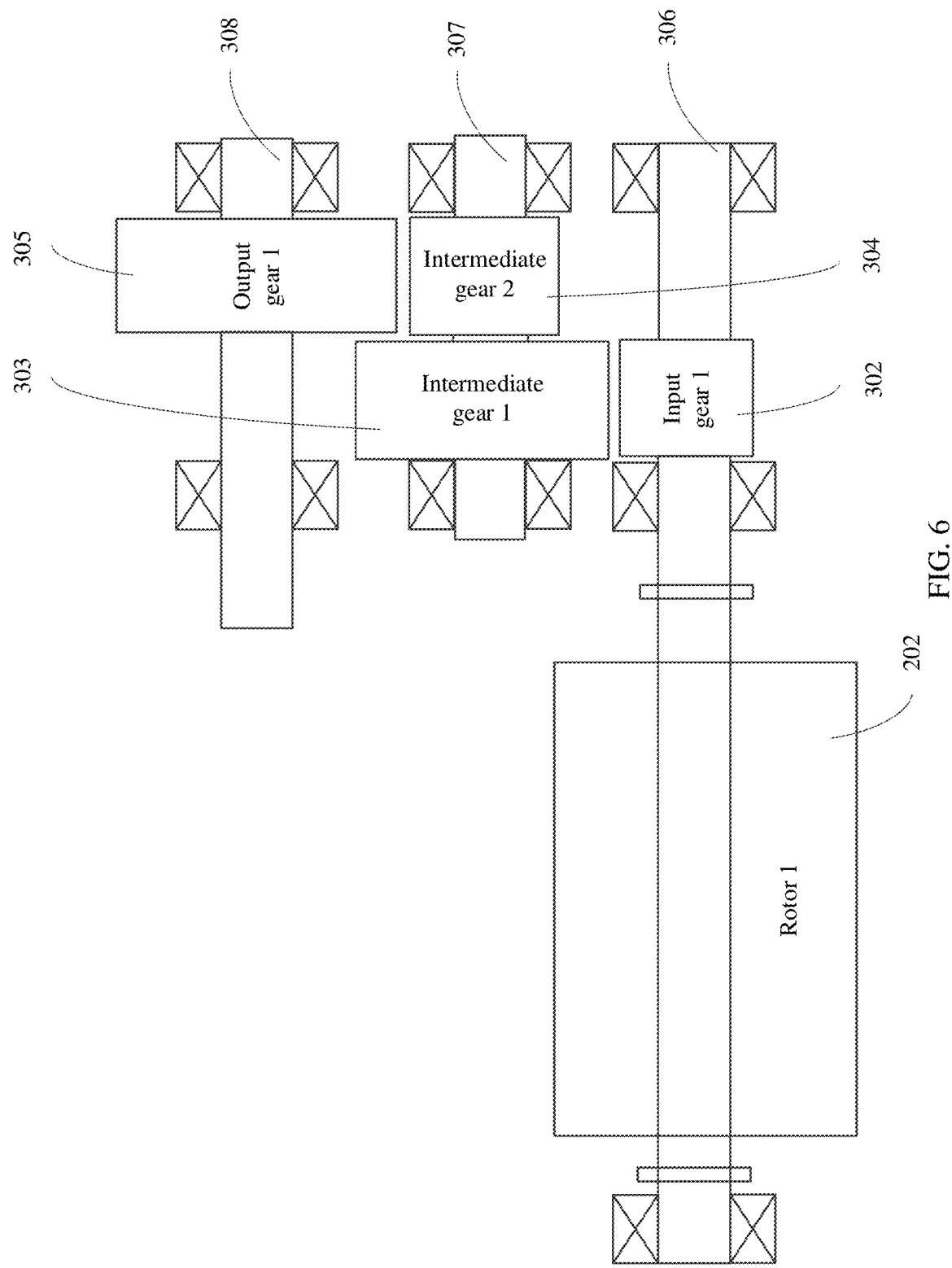
FIG. 6 is a schematic diagram of an amplified structure of a first speed reducer in FIG. 4.

In some possible embodiments, refer to FIG. 3, FIG. 4, and FIG. 6 together. The first speed reducer 30 may include a first cavity 301, and a first input gear 302, a first intermediate gear 303, a second intermediate gear 304, and a first output gear 305 that are located in the first cavity 301. The first input gear 302 is connected to the first rotor 202 for transmission, the first intermediate gear 303 is meshed with the first input gear 302, the second intermediate gear 304 is coaxially disposed with the first intermediate gear 303, and the first output gear 305 is meshed with the second intermediate gear 304, to form a second-stage speed reducer for transmitting torque, and after a speed of driving force output by the first speed reducer 30 is reduced, and torque of the driving force is increased, the driving force is output to the drive wheel. It should be understood that the first speed reducer 30 may further include a first input shaft 306, a first intermediate shaft 307, and a first output shaft 308. The first input gear 302 may be assembled to the first input shaft 306, and the first input shaft 306 may be integral with a rotation shaft of the first stator 201 or may be connected to a rotation shaft of the first rotor 201 for transmission by using a coupling. The first intermediate gear 303 and the second intermediate gear 304 may be assembled to the first intermediate shaft 307, and the first output gear 305 is assembled to the first output shaft 308.

Figure 7:
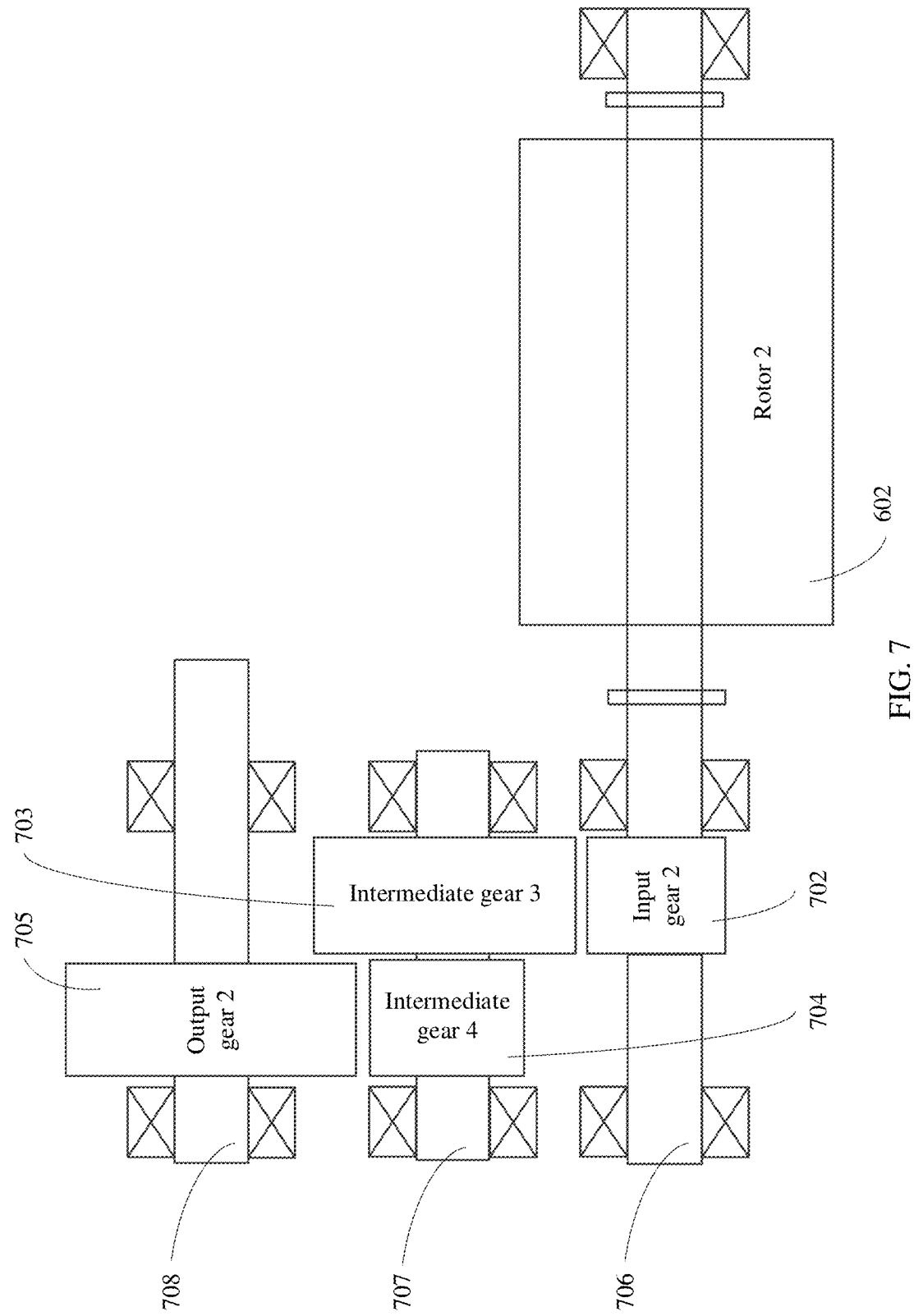
FIG. 7 is a schematic diagram of an amplified structure of a second speed reducer in FIG. 4.

Similarly, refer to FIG. 3, FIG. 4, and FIG. 7 together. The second speed reducer 70 may also include a second cavity 701, and further includes a second input gear 702, a third intermediate gear 703, a fourth intermediate gear 704, and a second output gear 705 that are located in the second cavity 701. The second input gear 702 is connected to the second rotor 602 for transmission, the third intermediate gear 703 is meshed with the second input gear 702, the fourth intermediate gear 704 is coaxially disposed with the third intermediate gear 703, and the second output gear 705 is meshed with the fourth intermediate gear 704, to form a second-stage speed reducer for transmitting torque, and after a speed of driving force output by the second speed reducer 70 is reduced, and torque of the driving force is increased, the driving force is output to the drive wheel. Similarly, the second speed reducer 70 may further include a second input shaft 706, a second intermediate shaft 707, and a second output shaft 708. The second input gear 702 is connected to the second input shaft 706, and the second input shaft 706 may further be integral with a rotation shaft of the second stator 601 or may be connected to a rotation shaft of the second rotor 602 for transmission by using a coupling. The third intermediate gear 703 and the fourth intermediate gear 704 may be assembled to the second intermediate shaft 707, and the second output gear 705 is assembled to the second output shaft 708.

It should be noted that when the third oil path 100 supplies oil to the first speed reducer 30 and the second speed reducer 70, the foregoing transmission apparatuses in the speed reducers on both sides can be cooled and lubricated, and another motion part in the speed reducer can also be cooled and lubricated. For example, when output shafts, intermediate shafts, and input shafts on both sides are assembled to the housing, a bearing may also be disposed between each shaft and the housing, so that the lubrication oil in the third oil path 100 can also cool and lubricate the bearing.

In this embodiment, as shown in FIG. 3, the first cavity 301 and the second cavity 701 may share one sidewall 102, so that the first speed reducer 30 and the second speed reducer 70 can work independently, and a structure can also be more compact.

In addition, the first cavity 301 and the second cavity 701 may be connected, so that after the lubricating oil enters the first cavity 301 and the second cavity 701, the lubricating oil in the two cavities can be mixed. In this way, it is ensured that oil levels in the two cavities are consistent, a case in which oil volumes in the cavities on both sides are different in a running process is avoided, and an air suction phenomenon is prevented in oil pumps on both sides.

In implementation, a through hole separately connected to the two cavities may be disposed on the sidewall 102, and the lubricating oil in the two cavities may flow back and forth through the through hole. A shape of the through hole is not limited. For example, the through hole may be a round hole, a square hole, or a polygonal hole. There may be one or more through holes. When there is one through hole, a size of the through hole may be slightly large, so that the lubricating oil in the two cavities can be rapidly circulated. When there may be a plurality of through holes, the plurality of through holes may be arranged in an array. For example, the through hole may be located at a position near the bottom of the sidewall 102, to prevent a case in which the lubricating oil in the two cavities cannot be circulated when an amount of lubricating oil in the two cavities is relatively small and the position of the through hole is at an upper position.

The foregoing solution used to enable the first cavity 301 and the second cavity 701 to be connected to each other is merely used as an example for description. In implementation, the lubricating oil in the two cavities may alternatively be circulated in another manner. Details are not described herein again.

Figure 8:
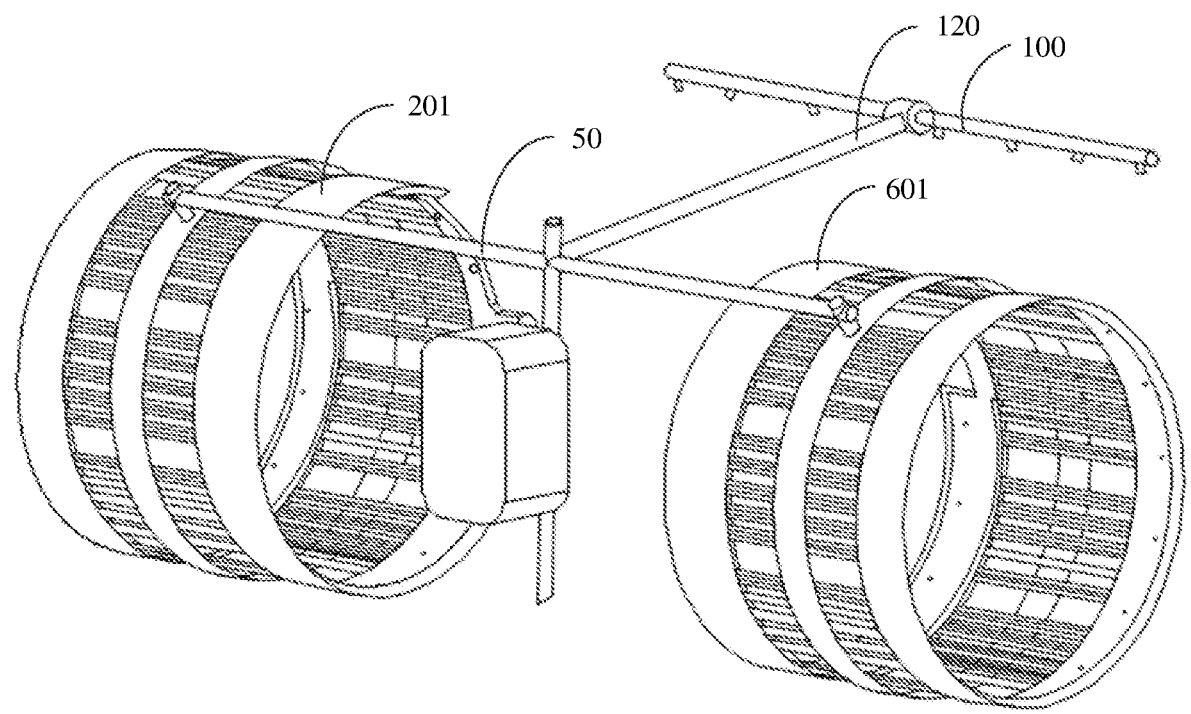
FIG. 8 is a schematic diagram of a partial oil path structure in FIG. 4.
Figure 9:
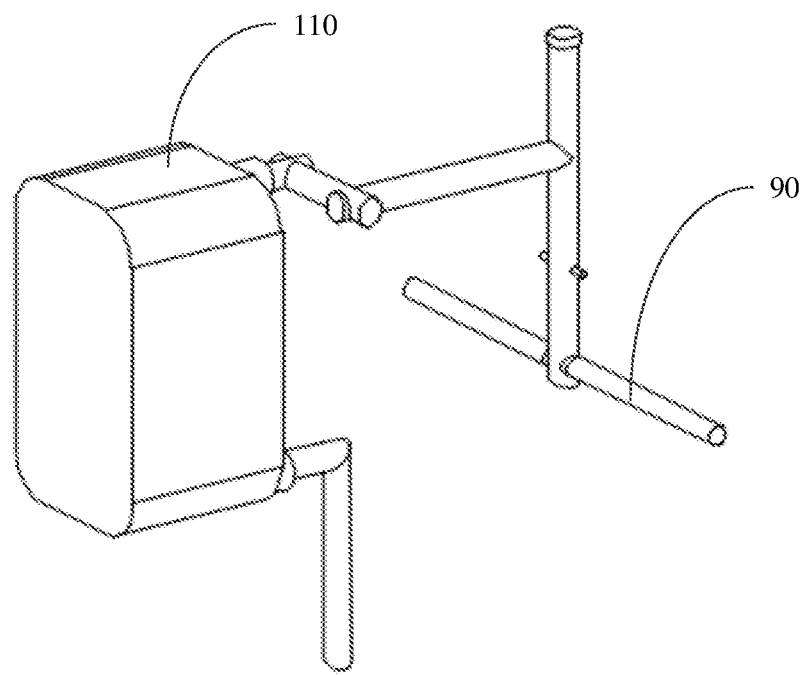
FIG. 9 is a schematic diagram of another partial oil path structure in FIG. 4.

In some possible embodiments, refer to FIG. 4, FIG. 8, and FIG. 9 together. The third oil path 100 may be integrated with the first oil path 50. In implementation, a first branch 120 may be added to the first oil path 50, and the first branch 120 is connected to the third oil path 100. In other words, the first oil pump 40 pumps the lubricating oil into the first stator 201, the second stator 601, the first speed reducer 30, and the second speed reducer 70, and the second oil pump 80 pumps the lubricating oil into the first rotor 202 and the second rotor 602. In this embodiment, after the first oil pump 40 sends the lubricating oil from the oil pan 101 to the heat exchanger 110 for cooling, some lubricating oil enters the first stator 201 and the second stator 601 based on a requirement through the first oil path 50, and then cools a coil winding by using an oil injection structure after performing cooling along an iron core surface of each stator; and some other lubricating oil enters the third oil path 100 through the first branch 120, enters the first speed reducer 30 and the second speed reducer 70 based on a requirement, and lubricate the speed reducers on both sides and the bearings. After the second oil pump 80 sends the lubricating oil from the oil pan 101 to the heat exchanger 110 for cooling, the lubricating oil enters rotation shafts of the first rotor 202 and the second rotor 602 based on a requirement through the second oil path 90 to cool the rotors on both sides, and is thrown out at a high speed with the rotors to cool the coil winding.

Figure 10:
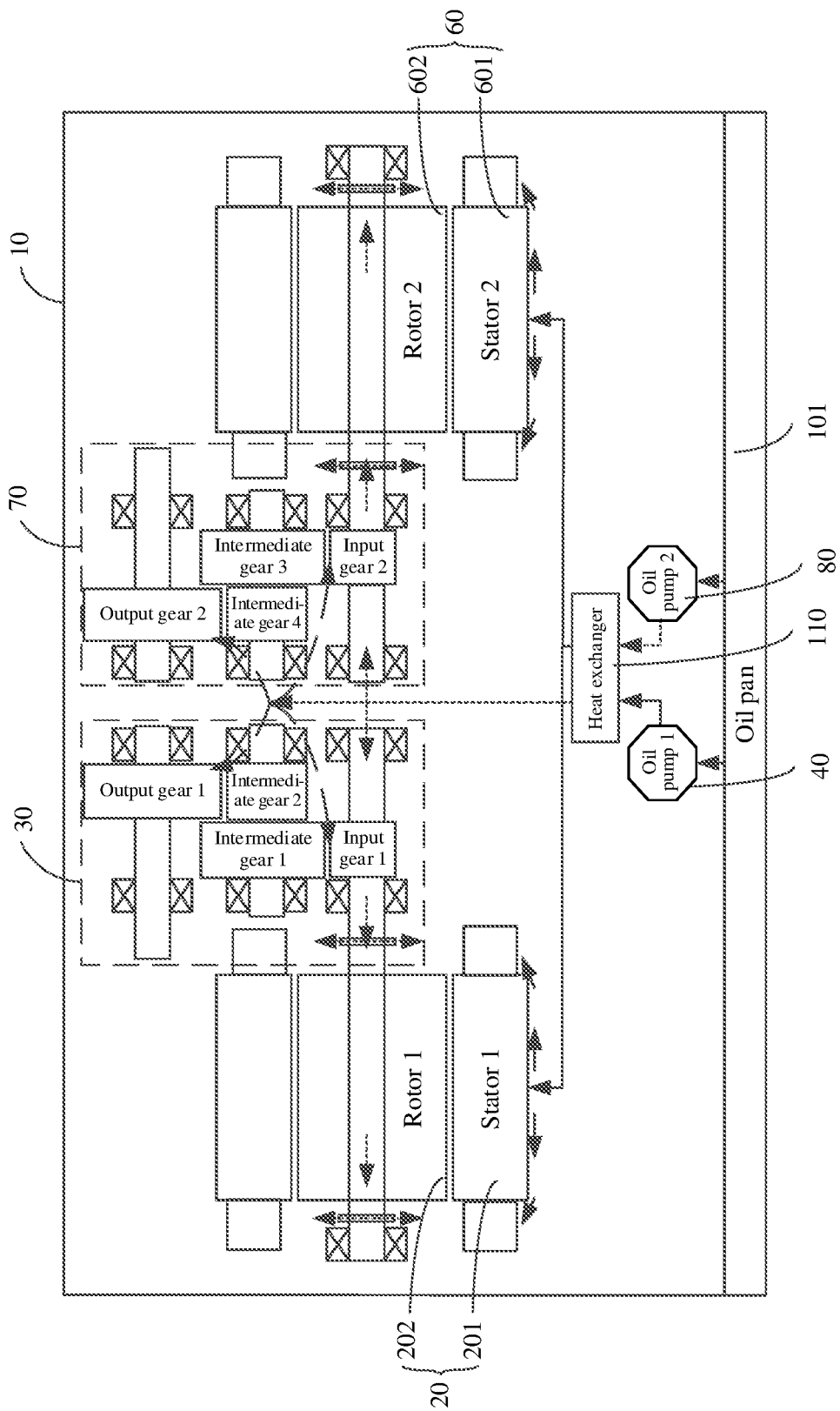
FIG. 10 is a schematic diagram of another overall oil path of a power assembly in FIG. 2.
Figure 11:
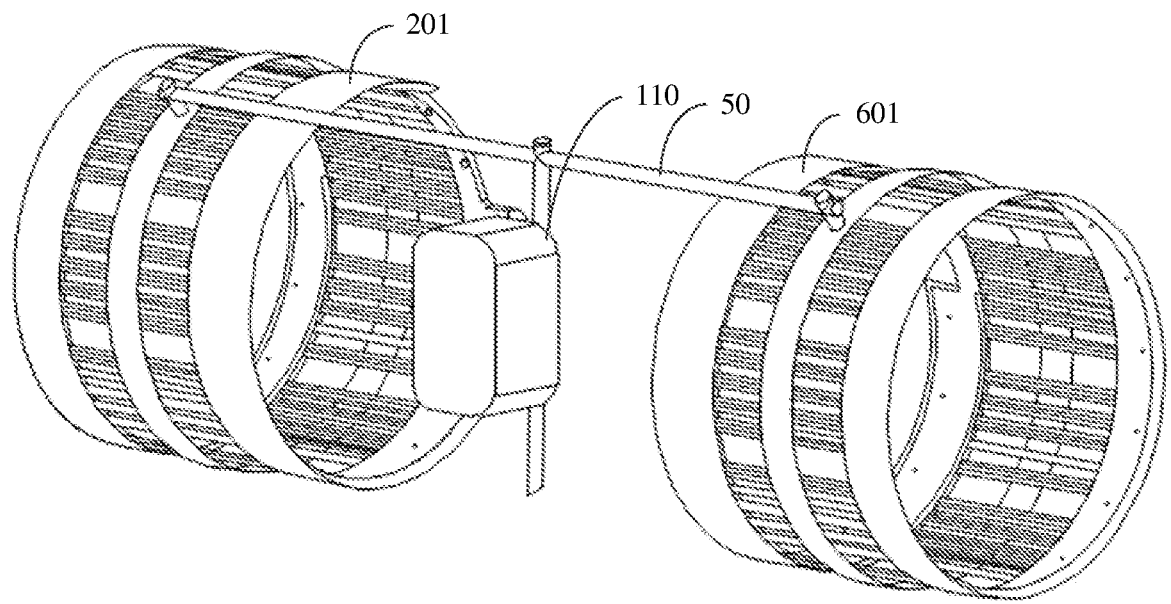
FIG. 11 is a schematic diagram of a partial oil path structure in FIG. 10.
Figure 12:
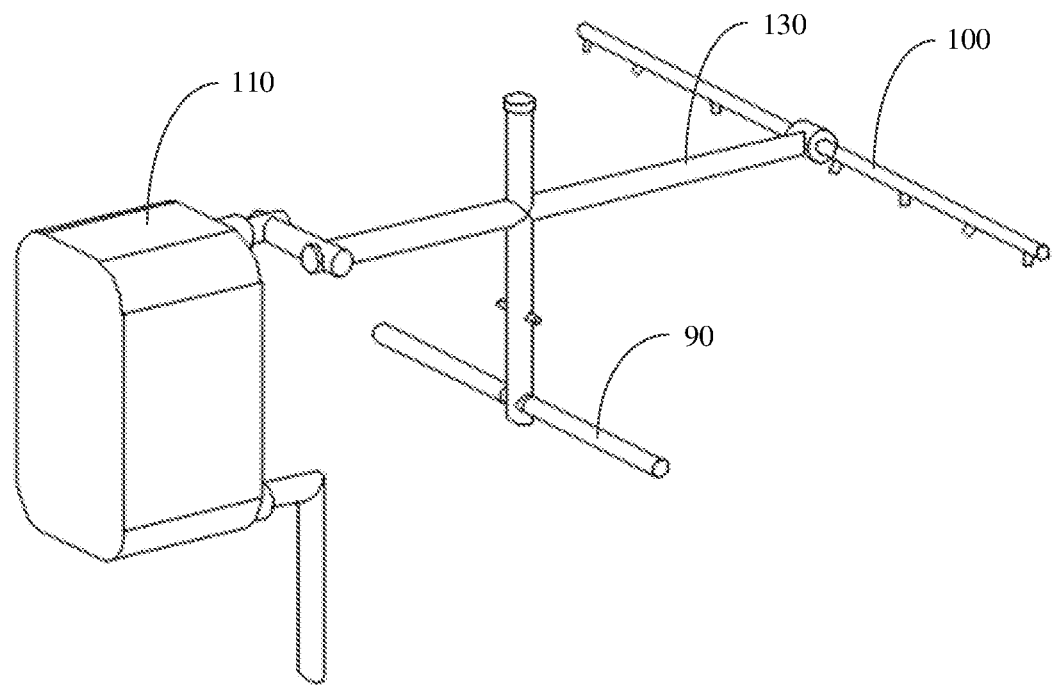
FIG. 12 is a schematic diagram of another partial oil path structure in FIG. 10.

In some possible embodiments, refer to FIG. 10 to FIG. 12. The third oil path 100 may be integrated with the second oil path 90. In implementation, a second branch 130 may be added to the second oil path 90, and the second branch 130 is connected to the third oil path 100. In other words, the first oil pump 40 pumps the lubricating oil into the first stator 201 and the second stator 601, and the second oil pump 80 pumps the lubricating oil into the first rotor 202, the second rotor 602, the first speed reducer 30, and the second speed reducer 70. In this embodiment, after the first oil pump 40 sends the lubricating oil from the oil pan 101 to the heat exchanger 110 for cooling, the lubricating oil enters the first stator 201 and the second stator 601 based on a requirement through the first oil path 50 and cools a coil winding by using an oil injection structure after performing cooling along an iron core surface of each stator. After the second oil pump 80 sends the lubricating oil from the oil pan 101 to the heat exchanger 110 for cooling, some lubricating oil enters rotation shafts of the first rotor 202 and the second rotor 602 based on a requirement through the second oil path 90 to cool the rotors on both sides, and is thrown out at a high speed with the rotors to cool the coil winding; and some other lubricating oil enters the third oil path 100 through the second branch 130, and enters the first speed reducer 30 and the second speed reducer 70 based on a requirement through the third oil path 100, to lubricate the speed reducers on both sides and the bearings.

Figure 13:
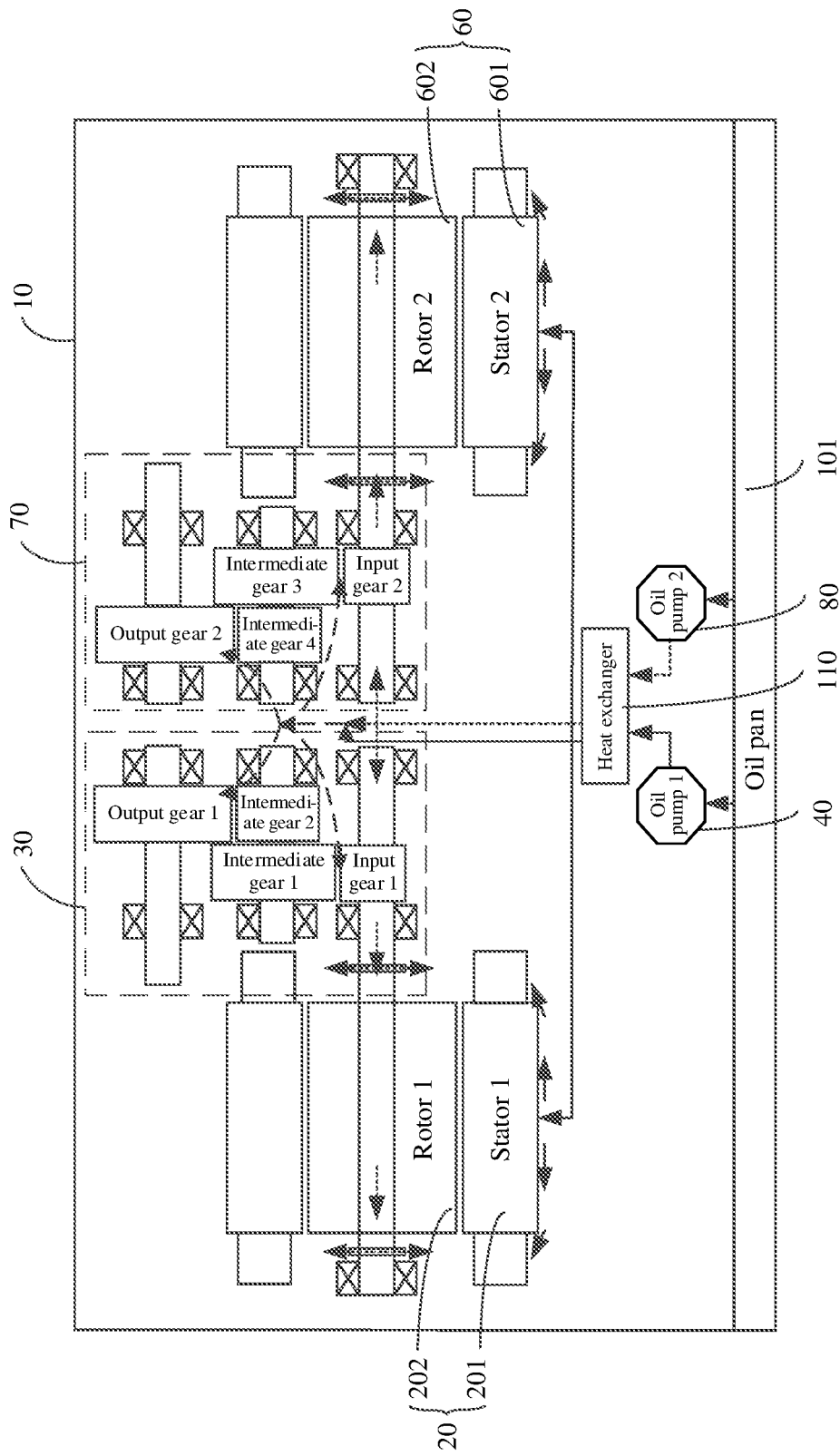
FIG. 13 is a schematic diagram of another overall oil path of a power assembly in FIG. 2.
Figure 14:
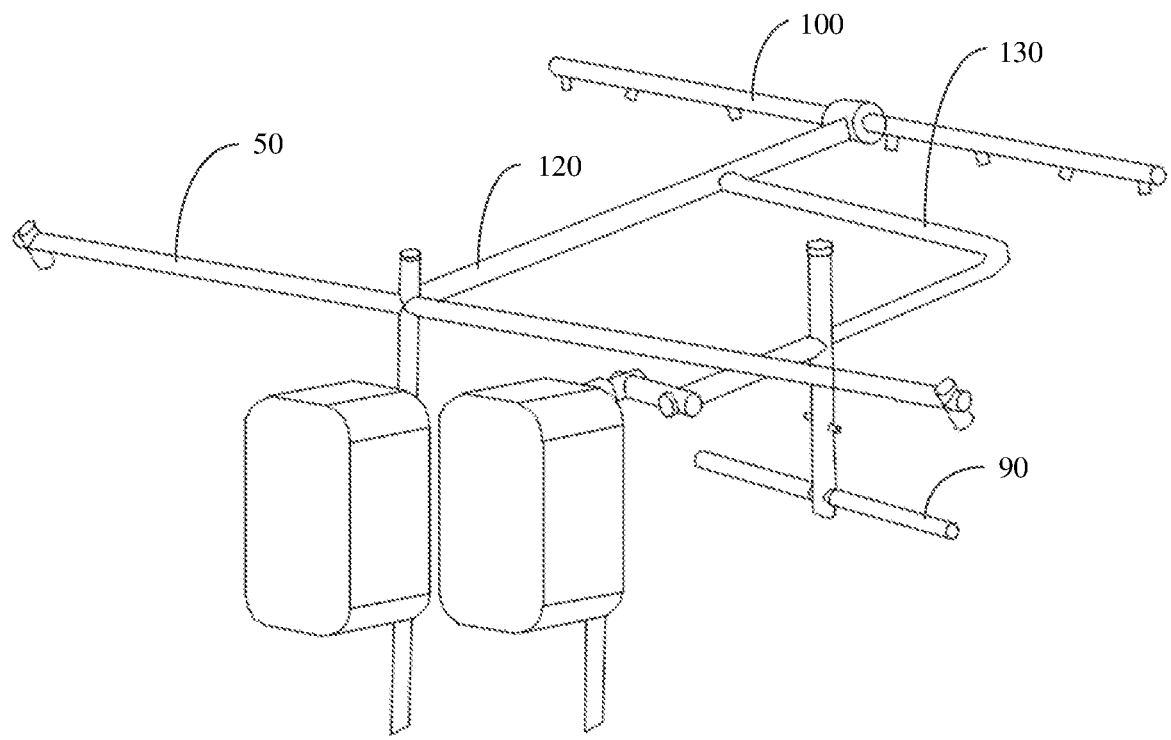
FIG. 14 is a schematic diagram of a partial oil path structure in FIG. 13.

In some possible embodiments, refer to FIG. 13 and FIG. 14. Both the first oil path 50 and the second oil path 90 may be connected to the third oil path 100. In implementation, a first branch 120 may be added to the first oil path 50, a second branch 130 may be added to the second oil path 90, and the first branch 120 and the second branch 130 are connected to the third oil path 100 after being combined. The first oil pump 40 may pump the lubricating oil into the first stator 201, the second stator 601, the first speed reducer 30, and the second speed reducer 70, and the second oil pump 80 may pump the lubricating oil into the first rotor 202, the second rotor 602, the first speed reducer 30, and the second speed reducer 70. In this embodiment, after the first oil pump 40 sends the lubricating oil from the oil pan 101 to the heat exchanger 110 for cooling, some lubricating oil in the first oil path 50 enters the first stator 201 and the second stator 601 based on a requirement, and then cools a coil winding by using an oil injection structure after performing cooling along an iron core surface of each stator. After the second oil pump 80 sends the lubricating oil from the oil pan 101 to the heat exchanger 110 for cooling, some lubricating oil in the second oil path 90 enters rotation shafts of the first rotor 202 and the second rotor 602 based on a requirement to cool the rotors on both sides, and is thrown out at a high speed with the rotors to cool the coil winding. Some other lubricating oil in the first oil path 50 may enter the third oil path 100 through the first branch 120, and some other lubricating oil in the second oil path 90 may enter the third oil path 100 through the second branch 130. In the third oil path 100, the lubricating oil may enter the first speed reducer 30 and the second speed reducer 70 based on a requirement, to lubricate the speed reducers on both sides and the bearings.

Figure 15:
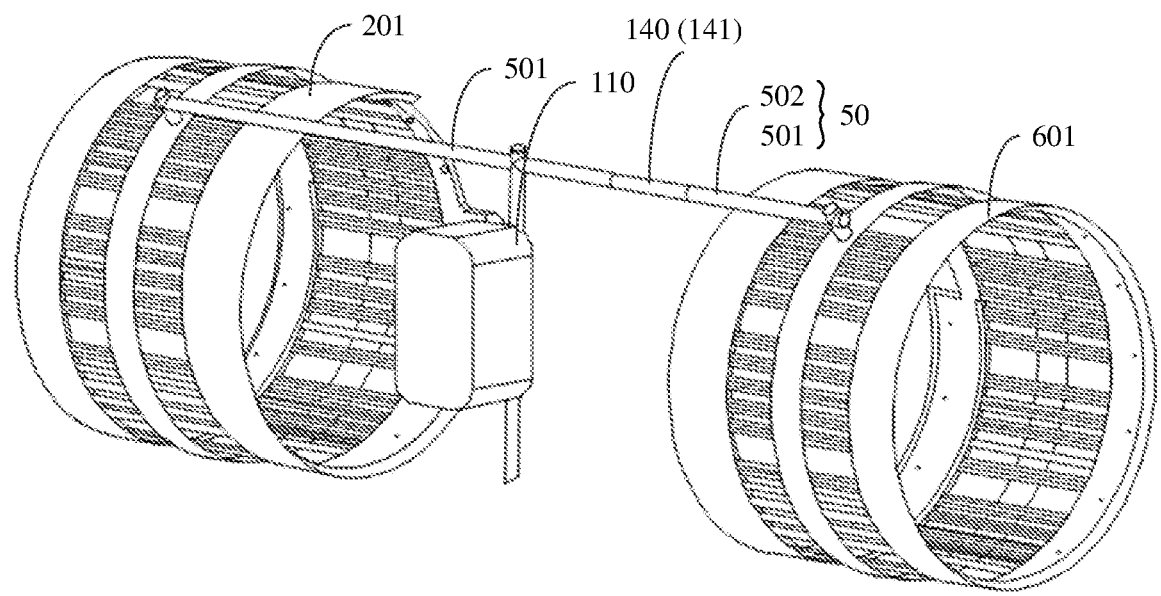
FIG. 15 is a schematic diagram of a partial oil path structure of a power assembly in FIG. 2.

In some possible embodiments, refer to FIG. 15. The first oil path 50 includes a first pipeline 501 used to supply oil to the first stator 201 and a second pipeline 502 used to supply oil to the second stator 601. A first flow regulating apparatus 140 may be disposed on the first pipeline 501 or the second pipeline 502, and the first flow regulating apparatus 140 regulates an amount of oil that enters the first stator 201 and the second stator 601, so that flow can be distributed to the stators on both sides based on a requirement. It should be noted that the first flow regulating apparatus 140 may be configured to increase flow or may be configured to decrease flow.

FIG. 15 is used as an example. When oil needs to be evenly distributed to the first stator 201 and the second stator 601, the lubricating oil separately enters the first pipeline 501 and the second pipeline 502 after being cooled by the heat exchanger 110. Due to a limitation of an internal space structure of the housing 10, when the first oil path 50 is connected to the heat exchanger 110, the first oil path 50 cannot be located in a middle part of the first stator 201 and the second stator 601, and consequently, a length of the first pipeline 501 is inconsistent with a length of the second pipeline 502. For example, when the first oil path 50 is disposed at a position close to a side of the first stator 201, the length of the second pipeline 502 is longer than the length of the first pipeline 501. Consequently, an amount of lubricating oil entering the second pipeline 502 is greater than an amount of lubricating oil entering the first pipeline 501, and further, an amount of lubricating oil entering the second stator 601 is greater than an amount of lubricating oil entering the first stator 201. In this case, the first flow regulating apparatus 140 may be a first throttling component disposed on the second pipeline 502. In implementation, the first throttling component may be a first throttling pipe 1401, and the first throttling pipe 1401 may increase flow resistance in the second pipeline 502, so that the amount of lubricating oil entering the second stator 601 may be reduced to some extent, to be balanced with the amount of lubricating oil in the first pipeline 501. In this way, it is ensured that amounts of lubricating oil on both sides are evenly distributed. Further, in some other embodiments, the first throttling component may alternatively be another structure that may be configured to reduce flow in the second pipeline 502, such as a throttling valve. Alternatively, a structure of the first pipeline 501 may be improved, so that the amount of lubricating oil entering the first pipeline 501 increases. For example, a diameter of a part of the first pipeline 501 or the entire first pipeline 501 is greater than a diameter of the second pipeline 502, so that an effect of evenly distributing the oil can also be achieved.

It should be noted that in this embodiment, only a requirement for evenly distributing flow is described. In actual application, amounts of lubricating oil required by the stators on both sides may alternatively be different. In this case, the first throttling pipe 1401 may be based on amounts of oil required by the stators on both sides. For example, a diameter or a length of the first throttling pipe 1401 may be controlled to meet a requirement for distributing oil based on a requirement. Details are not described.

Figure 16:
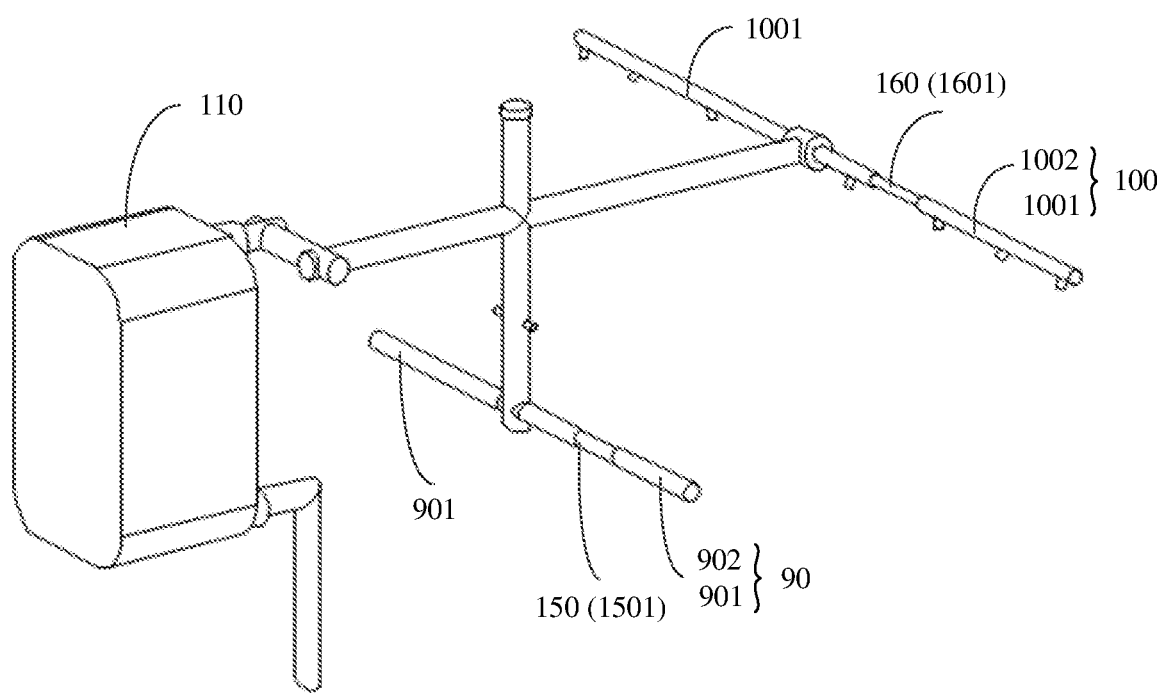
FIG. 16 is a schematic diagram of another partial oil path structure of a power assembly in FIG. 2.

In some possible embodiments, refer to FIG. 16. The second oil path 90 includes a third pipeline 901 used to supply oil to the first rotor and a fourth pipeline 902 used to supply oil to the second rotor. A second flow regulating apparatus 150 may be disposed on the third pipeline 901 or the fourth pipeline 902, and the second flow regulating apparatus 150 regulates an amount of oil that enters the first rotor and the second rotor, so that flow can be distributed to the rotors on both sides based on a requirement. It should be noted that the second flow regulating apparatus 150 may be configured to increase flow or may be configured to decrease flow.

FIG. 16 is used as an example. When oil needs to be evenly distributed to the first rotor and the second rotor, the lubricating oil separately enters the third pipeline 901 and the fourth pipeline 902 after being cooled by the heat exchanger 110. Due to a limitation of an internal space structure of the housing 10, when the second oil path 90 is connected to the heat exchanger 110, the second oil path 90 cannot be located in a middle part of the first rotor 202 and the second rotor 602, and consequently, a length of the third pipeline 901 is inconsistent with a length of the fourth pipeline 902. For example, when the second oil path 90 is disposed at a position close to a side of the first rotor 202, the length of the fourth pipeline 902 is longer than the length of the third pipeline 901. Consequently, an amount of lubricating oil in the fourth pipeline 902 is greater than an amount of lubricating oil in the third pipeline 901, and further, an amount of lubricating oil entering the second rotor is greater than an amount of lubricating oil entering the first rotor. In this case, the second flow regulating apparatus 150 may be a second throttling component disposed on the fourth pipeline 902. In implementation, the second throttling component may be a second throttling pipe 1501, and the second throttling pipe 1501 may increase flow resistance in the fourth pipeline 902, so that the amount of lubricating oil entering the first rotor may be reduced to some extent, to be balanced with the amount of lubricating oil in the third pipeline 901. In this way, it is ensured that amounts of lubricating oil on both sides are evenly distributed. Additionally, in some other embodiments, the second throttling component may alternatively be another structure that may be configured to reduce flow in the fourth pipeline 902, such as a throttling valve. Alternatively, a structure of the third pipeline 901 may be improved, so that the amount of lubricating oil entering the third pipeline 901 increases. For example, a diameter of a part of the third pipeline 901 or the entire third pipeline 901 is greater than a diameter of the fourth pipeline 902, so that an effect of evenly distributing the oil can also be achieved.

It should be noted that in this embodiment, only a requirement for evenly distributing flow is described. In actual application, amounts of lubricating oil required by the rotors on both sides may alternatively be different. In this case, the second throttling pipe 1501 may be based on required amounts of the rotors on both sides. For example, a diameter or a length of the second throttling pipe 1501 may be controlled to meet a requirement for distributing oil based on a requirement. Details are not described.

In some possible embodiments, still refer to FIG. 16. The third oil path 100 includes a fifth pipeline 1001 used to supply oil to the first speed reducer and a sixth pipeline 1002 used to supply oil to the second speed reducer. A third flow regulating apparatus 160 may be disposed on the fifth pipeline 1001 or the sixth pipeline 1002, and the third flow regulating apparatus 160 regulates an amount of oil that enters the first speed reducer and the second speed reducer, so that flow can be distributed to the speed reducers on both sides based on a requirement. It should be noted that the third flow regulating apparatus 160 may be configured to increase flow or may be configured to decrease flow.

FIG. 16 is used as an example. When oil needs to be evenly distributed to the first speed reducer and the second speed reducer, the lubricating oil enters the third oil path 100 after being cooled by the heat exchanger 110. Due to a limitation of an internal space structure of the housing 10, when the third oil path 100 splits flow for the fifth pipeline 1001 and the sixth pipeline 1002, a flow splitting port of the third pipeline 100 is located in the first speed reducer, and a length of the sixth pipeline 1002 is greater than a length of the fifth pipeline 1001. Consequently, an amount of lubricating oil in the sixth pipeline 1002 is greater than an amount of lubricating oil in the fifth pipeline 1001, and consequently, an amount of lubricating oil entering the second speed reducer 70 is greater than an amount of lubricating oil entering the first speed reducer 30. In this case, the third flow regulating apparatus 160 may be a third throttling component disposed on the sixth pipeline 1002. In implementation, the third throttling component may be a third throttling pipe 1601, and the third throttling pipe 1601 may increase flow resistance in the sixth pipeline 1002, so that the amount of lubricating oil entering the speed reducer 70 is reduced to some extent, to be balanced with the amount of lubricating oil in the fifth pipeline 1001. In this way, it is ensured that amounts of lubricating oil on both sides are evenly distributed. Further, in some other embodiments, the third throttling component may alternatively be another structure that may be configured to reduce flow in the sixth pipeline 1002, such as a throttling valve. Alternatively, a structure of the fifth pipeline 1001 may be improved, so that the amount of lubricating oil entering the fifth pipeline 1001 increases. For example, a diameter of a part of the fifth pipeline 1001 or the entire fifth pipeline 1001 is greater than a diameter of the sixth pipeline 1002, so that an effect of evenly distributing the oil can also be achieved.

It should be noted that in this embodiment, only a requirement for evenly distributing flow is described. In actual application, amounts of lubricating oil required by the speed reducers on both sides may alternatively be different. In this case, the third throttling pipe 1601 may be based on required amounts of the speed reducers on both sides. For example, a diameter or a length of the third throttling pipe 1601 may be controlled to meet a requirement for distributing oil based on a requirement. Details are not described.

It should be noted that, in implementation, the power assembly may include one or more of the first flow regulating apparatus 140, the second flow regulating apparatus 150, and the third flow regulating apparatus 160. A structure may be based on flow requirements of the drive motors and the speed reducers on both sides, so that in different operating conditions of the entire vehicle 200, the first oil pump 40 and the second oil pump 80 adjust an operation policy based on loss distribution of the stators and the rotors on both sides, to reduce power to a maximum extent, and achieve an energy saving effect.

It should be further noted that, in a case of no conflict, embodiments and features in the embodiments may be combined with each other, and any combination of features in different embodiments also falls within the scope of the embodiments. In other words, the plurality of embodiments described above may be further randomly combined based on an actual requirement.

Compared with a conventional dual-drive power assembly, in the power assembly in this embodiment, the first oil path is used to lubricate the stators on both sides, the second oil path is used to lubricate the rotors on both sides, the third oil path used to lubricate the speed reducers on both sides is integrated with the first oil path and/or the second oil path, and one heat exchanger is disposed to cool the oil paths, so that the oil path in the housing can be simplified, an integration level of the power assembly can be improved, and it can be ensured that the drive motors on both sides maintain similar heat dissipation conditions. In addition, through adjustment of a size of the oil path, flow can be distributed to the drive motors and the speed reducers on both sides based on a requirement, and this helps improve overall performance of the power assembly.

The foregoing descriptions are merely implementations, but are not intended to limit the scope of the embodiments. Any variation or replacement readily figured out by a person skilled in the art shall fall within the scope of the embodiments.

What is claimed is:

1. A power assembly, comprising:
   a housing, wherein an oil pan for storing lubricating oil is disposed on the housing;
   a first drive motor and a first speed reducer that are disposed inside the housing, wherein the first drive motor comprises a first stator and a first rotor, and the first speed reducer is connected to the first rotor;
   a second drive motor and a second speed reducer that are disposed inside the housing, wherein the second drive motor comprises a second stator and a second rotor, and the second speed reducer is connected to the second rotor;
   a first oil pump and a second oil pump, wherein an oil inlet of the first oil pump is connected to the oil pan, and an oil inlet of the second oil pump is connected to the oil pan;
   a first oil path disposed inside the housing, wherein the first oil path is connected to an oil outlet of the first oil pump, and the first oil path is configured to supply oil to the first stator and the second stator;
   a second oil path disposed inside the housing, wherein the second oil path is connected to an oil outlet of the second oil pump, and the second oil path is configured to supply oil to the first rotor and the second rotor; and
   a third oil path disposed inside the housing, wherein the third oil path is connected to at least one of the first oil path and the second oil path, and the third oil path is configured to supply oil to the first speed reducer and the second speed reducer.

2. The power assembly according to claim 1, wherein the first oil path is provided with a first branch, one end of the first branch is connected to the first oil path, and the other end of the first branch is connected to the third oil path.

3. The power assembly according to claim 1, wherein the second oil path is provided with a second branch, one end of the second branch is connected to the second oil path, and the other end of the second branch is connected to the third oil path.

4. The power assembly according to claim 1, further comprising:
   a heat exchanger, wherein the first oil pump is connected to the first oil path through the heat exchanger, and the second oil pump is connected to the second oil path through the heat exchanger.

5. The power assembly according to claim 4, wherein a first heat exchange branch and a second heat exchange branch are disposed in the heat exchanger, the first heat exchange branch is connected between the first oil pump and the first oil path, the second heat exchange branch is connected between the second oil pump and the second oil path, and the first heat exchange branch and the second heat exchange branch are independent of each other.

6. The power assembly according to claim 4, wherein a heat exchange main pipe is disposed in the heat exchanger, both the oil outlet of the first oil pump and the oil outlet of the second oil pump are connected to an oil inlet of the heat exchange main pipe, and the first oil path and the second oil path are separately connected to an oil outlet of the heat exchange main pipe.

7. The power assembly according to claim 1, wherein the first oil path comprises a first pipeline and a second pipeline, the first pipeline is configured to supply oil to the first stator, the second pipeline is configured to supply oil to the second stator, and the first pipeline or the second pipeline is provided with a first flow regulating apparatus.

8. The power assembly according to claim 7, wherein the first flow regulating apparatus is a first throttling component.

9. The power assembly according to claim 1, wherein the second oil path comprises a third pipeline and a fourth pipeline, the third pipeline is configured to supply oil to the first rotor, the fourth pipeline is configured to supply oil to the second rotor, and the third pipeline or the fourth pipeline is provided with a second flow regulating apparatus.

10. The power assembly according to claim 9, wherein the second flow regulating apparatus is a second throttling component.

11. The power assembly according to claim 1, wherein the third oil path comprises a fifth pipeline and a sixth pipeline, the fifth pipeline is configured to supply oil to the first speed reducer, the sixth pipeline is configured to supply oil to the second speed reducer, and the fifth pipeline or the sixth pipeline is provided with a third flow regulating apparatus.

12. The power assembly according to claim 11, wherein the third flow regulating apparatus is a third throttling component.

13. The power assembly according to claim 1, wherein the first speed reducer comprises a first cavity, the second speed reducer comprises a second cavity, and the first cavity is connected to the second cavity.

14. A vehicle, comprising a drive wheel and a power assembly, and the power assembly comprises:
   a housing, wherein an oil pan for storing lubricating oil is disposed on the housing;
   a first drive motor and a first speed reducer that are disposed inside the housing, wherein the first drive motor comprises a first stator and a first rotor, and the first speed reducer is connected to the first rotor;
   a second drive motor and a second speed reducer that are disposed inside the housing, wherein the second drive motor comprises a second stator and a second rotor, and the second speed reducer is connected to the second rotor;
   a first oil pump and a second oil pump, wherein an oil inlet of the first oil pump is connected to the oil pan, and an oil inlet of the second oil pump is connected to the oil pan;
   a first oil path disposed inside the housing, wherein the first oil path is connected to an oil outlet of the first oil pump, and the first oil path is configured to supply oil to the first stator and the second stator;
   a second oil path disposed inside the housing, wherein the second oil path is connected to an oil outlet of the second oil pump, and the second oil path is configured to supply oil to the first rotor and the second rotor; and
   a third oil path disposed inside the housing, wherein the third oil path is connected to at least one of the first oil path and the second oil path, and the third oil path is configured to supply oil to the first speed reducer and the second speed reducer;
   wherein the power assembly is connected to the drive wheel for transmission.

15. The vehicle according to claim 14, wherein the first oil path is provided with a first branch, one end of the first branch is connected to the first oil path, and the other end of the first branch is connected to the third oil path.

16. The vehicle according to claim 14, wherein the second oil path is provided with a second branch, one end of the second branch is connected to the second oil path, and the other end of the second branch is connected to the third oil path.

17. The vehicle according to claim 14, further comprising:
a heat exchanger, wherein the first oil pump is connected to the first oil path through the heat exchanger, and the second oil pump is connected to the second oil path through the heat exchanger.

\* \* \* \* \*